(12) United States Patent
Kantamneni et al.

(10) Patent No.: US 12,141,849 B1
(45) Date of Patent: Nov. 12, 2024

(54) SYSTEM AND METHOD OF PROVIDING SEAMLESS LIVE COMPARISON USING MULTI-PANEL AUGMENTED REALITY

(71) Applicant: Mirelz Inc., Plano, TX (US)

(72) Inventors: Harish Kantamneni, Plano, TX (US); Pratima Adusumilli, Plano, TX (US)

(73) Assignee: MIRELZ INC., Plano, TX (US)

( * ) Notice: Subject to any disclaimer, the term of this patent is extended or adjusted under 35 U.S.C. 154(b) by 829 days.

(21) Appl. No.: 16/808,034

(22) Filed: Mar. 3, 2020

Related U.S. Application Data

(60) Provisional application No. 62/929,117, filed on Nov. 1, 2019.

(51) Int. Cl.
   *G06Q 30/0601* (2023.01)
   *G06F 3/0485* (2022.01)
   *G06T 15/50* (2011.01)
   *G06T 19/00* (2011.01)

(52) U.S. Cl.
   CPC ....... *G06Q 30/0629* (2013.01); *G06F 3/0485* (2013.01); *G06Q 30/0643* (2013.01); *G06T 15/50* (2013.01); *G06T 19/006* (2013.01)

(58) Field of Classification Search
   None
   See application file for complete search history.

(56) References Cited

U.S. PATENT DOCUMENTS

| | | | |
|---|---|---|---|
| 6,624,843 B2 | 9/2003 | Lennon | |
| 7,133,839 B2 | 11/2006 | Inoue | |
| 8,606,645 B1 | 12/2013 | Applefeld | |
| 9,646,340 B2 | 5/2017 | Kapur | |
| 10,755,487 B1 | 8/2020 | Snibbe | |
| 2002/0105530 A1* | 8/2002 | Waupotitsch | G02C 13/003 345/630 |

(Continued)

FOREIGN PATENT DOCUMENTS

GB  2525945 A * 11/2015 ......... G06F 3/03547

OTHER PUBLICATIONS

K. M. A. Yousef, B. J. Mohd and M. Al-Omari, "Kinect-Based Virtual Try-on System: A Case Study," 2019 IEEE Jordan International Joint Conference on Electrical Engineering and Information Technology (JEEIT), Amman, Jordan, 2019, pp. 91-96, doi: 10.1109/JEEIT.2019.8717498. (Year: 2019).*

(Continued)

*Primary Examiner* — Michelle T Kringen

(57) ABSTRACT

A method includes receiving a first identification of a first accessory, receiving a second identification of a second accessory, receiving a live video stream of a user, and receiving a request for a live compare session. Based on the request, the method includes loading a first 3-dimensional rendering system instance and a first product node tree for the first accessory, based on the request, loading a second 3-dimensional rendering system instance and a second product node tree for the second accessory and displaying, in the live compare session and based on the first 3-dimensional rendering system instance and the first product node tree, the live video stream of the user having the first accessory and displaying, in the live compare session and based on the second 3-dimensional rendering system instance and the second product node tree, the live video stream of the user having the second accessory.

22 Claims, 7 Drawing Sheets

(56) References Cited

U.S. PATENT DOCUMENTS

| | | | |
|---|---|---|---|
| 2012/0330984 A1* | 12/2012 | Fablet | G06F 40/143 |
| | | | 707/755 |
| 2013/0113829 A1 | 5/2013 | Suzuki | |
| 2014/0035913 A1 | 2/2014 | Higgins | |
| 2014/0149264 A1 | 5/2014 | Satyanarayana | |
| 2015/0022550 A1* | 1/2015 | Katpally Reddy | G06T 19/006 |
| | | | 345/632 |
| 2016/0005106 A1* | 1/2016 | Giraldez | G06T 19/20 |
| | | | 705/27.2 |
| 2017/0270581 A1 | 9/2017 | Tang | |
| 2019/0188784 A1* | 6/2019 | Bleicher | G06F 16/00 |
| 2021/0224886 A1* | 7/2021 | Fu | G06Q 30/0623 |

OTHER PUBLICATIONS https://www.retaildive.com/ex/mobilecommercedaily/rimmel-unveils-augmented-reality-mirror-virtual-try-on-options-for-cosmetics (Year: 2017).

* cited by examiner

SYSTEM AND METHOD OF PROVIDING SEAMLESS LIVE COMPARISON USING MULTI-PANEL AUGMENTED REALITY

CROSS-REFERENCE TO RELATED APPLICATIONS

This application claims the benefit of, and priority to, U.S. Provisional Patent Application No. 62/929,117, filed Nov. 1, 2019, entitled "ENABLING SEAMLESS LIVE COMPARISON USING MULTI-PANEL AR," the contents of which are incorporated herein by reference in their entirety. The present application is related to application Ser. No. 16/731,716 and application Ser. No. 16/731,789, both filed on Dec. 31, 2019. The contents of both of these applications are incorporated herein by reference.

FIELD OF THE INVENTION

The present disclosure relates to presenting a virtual environment which enables a user to use augmented reality to try on and simultaneously compare how different accessories look on the user in a live stream, in which the live stream is duplicated for each different accessory for simultaneous viewing.

BACKGROUND

With the advent of augmented reality (AR) technologies, a user can superimpose computer-generated images of various accessories on to a graphical representation of the user's real-world environment. For instance, retailers often use AR technologies, implemented on an application and/or website, to create a realistic try-on experience for their customers. A customer, accessing the application and/or website, may superimpose a computer-generated image of an accessory over a real-world image of the customer to allow the customer to determine how the accessory would look on the customer without having to physically don the accessory in a physical store.

When customers shop for accessories and apparel in a retail store, they typically want to arrive at a shortlist of items. The customer desires to compare the looks before buying the final item. For example, the user may desire to compare three different sets of earrings before making the final purchase. When physically in a store, it is hard if not impossible to compare simultaneously more than one item, such as earrings. A live comparison is hard to achieve physically in the store since the customer cannot wear all the items at the same time and compare. The user could capture images using the "selfie" mode of a mobile device as they try on each item physically and compare different images. This approach is not seamless and also cannot compare more than two images easily at the same time.

SUMMARY

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosure presented herein solves the problem described above regarding the lack of ability to do a live compare of two or more items or accessories that a user desires to try on. The improvement disclosed herein relates to a new "live compare" system that improves upon existing technology. As noted above, the existing technology basically relates to a camera with a selfie feature on a device. In one aspect, a user could try on a pair of earrings and view themselves using a selfie mode of their phone. The user could then try on each pair of earrings separately and finally make a decision on what to purchase. A user in a physical store could take separate pictures of themselves wearing different earrings and then could look through the different pictures. This technical approach does not enable or provide the ability to do a simultaneous, side-by-side comparison of the accessories on the user.

The present disclosure introduces new technologies to manage image data to provide a "live compare" experience for a user to see simultaneously different images or video with different user interaction options and new capabilities. Thus, while the user is viewing their own live image, the user can select multiple accessories to "try on" using augmented reality. The system can present multiple simultaneous comparable views of the user with the difference accessories. This new graphical framework enables the user to more easily and efficiently compare accessories and easily discard some options or purchase other options. Using the disclosed technologies, a user could select two or more accessories, such as two sets of earrings, and then request a "live compare" mode in which side-by-side video streams would be presented with each respective video stream having one of the respective sets of earrings shown on the user. The user can compare the two sets or accessories simultaneously.

The system will provide a 3-dimensional rendering system instance and a corresponding product node tree for each "look" in a live comparison mode. The system can load or delete these rendering instances and corresponding node trees for products based on whether a respective live comparison look is currently being viewed, currently invisible, about to be viewed or about to be invisible. For example, if the user selects 8 accessories which can lead to multiple images of the user, some of which might be off screen, the system can load or delete rendering instances based on whether a respective live stream is visible or not at any given time.

A method can include one or more of receiving, via a user interface, a first identification of a first accessory to be tried on by a user in an augmented reality environment, receiving, via the user interface, a second identification of a second accessory to be tried on by the user in the augmented reality environment, receiving a live video stream of the user, receiving a request via the user interface for a live compare session in the augmented reality environment and, in response to the request, displaying in a first portion of the user interface, the live video stream of the user having the first accessory in the augmented reality environment and displaying in a second portion of the user interface, the live video stream of the user having the second accessory in the augmented reality environment. Of course more than two instances of live streams can be presented. The steps of the method or operations can be in any order and can include any one or more of the disclosed steps.

A system can include one or more processors and memory that includes instructions that, as a result of being executed by the one or more processors, cause the system to cause the one or more processors to perform one or more operations including: receiving, via a user interface, a first identification of a first accessory to be tried on by a user in an augmented reality environment, receiving, via the user interface, a second identification of a second accessory to be tried on by the user in the augmented reality environment, receiving a live video stream of the user, receiving a request via the user interface for a live compare session in the augmented reality environment and, in response to the request, displaying in a first portion of the user interface, the live video stream of the user having the first accessory in the augmented reality environment and displaying in a second portion of the user interface, the live video stream of the user having the second accessory in the augmented reality environment.

A non-transitory computer-readable storage medium can include instructions which, as a result of being executed by one or more processors, cause the one or more processors to perform one or more operations including: receiving, via a user interface, a first identification of a first accessory to be tried on by a user in an augmented reality environment, receiving, via the user interface, a second identification of a second accessory to be tried on by the user in the augmented reality environment, receiving a live video stream of the user, receiving a request via the user interface for a live compare session in the augmented reality environment and, in response to the request, displaying in a first portion of the user interface, the live video stream of the user having the first accessory in the augmented reality environment and displaying in a second portion of the user interface, the live video stream of the user having the second accessory in the augmented reality environment.

In another aspect, a method can include one or more of receiving, via a user interface, a first identification of a first accessory to be tried on by a user in an augmented reality environment, receiving, via the user interface, a second identification of a second accessory to be tried on by the user in the augmented reality environment, receiving a live video stream of the user, and receiving a request via the user interface for a live compare session in the augmented reality environment. The method can further include, based on the request, loading a first 3-dimensional rendering system instance and a first product node tree for the first accessory, based on the request, loading a second 3-dimensional rendering system instance and a second product node tree for the second accessory and displaying, in the live compare session and based on the first 3-dimensional rendering system instance and the first product node tree, the live video stream of the user having the first accessory and displaying, in the live compare session and based on the second 3-dimensional rendering system instance and the second product node tree, the live video stream of the user having the second accessory.

A system can include one or more processors and memory that includes instructions that, as a result of being executed by the one or more processors, cause the system to cause the one or more processors to perform one or more operations including: receiving, via a user interface, a first identification of a first accessory to be tried on by a user in an augmented reality environment, receiving, via the user interface, a second identification of a second accessory to be tried on by the user in the augmented reality environment, receiving a live video stream of the user, receiving a request via the user interface for a live compare session in the augmented reality environment, based on the request, loading a first 3-dimensional rendering system instance and a first product node tree for the first accessory, based on the request, loading a second 3-dimensional rendering system instance and a second product node tree for the second accessory and displaying, in the live compare session and based on the first 3-dimensional rendering system instance and the first product node tree, the live video stream of the user having the first accessory and displaying, in the live compare session and based on the second 3-dimensional rendering system instance and the second product node tree, the live video stream of the user having the second accessory.

A non-transitory computer-readable storage medium can include instructions which, as a result of being executed by one or more processors, cause the one or more processors to perform one or more operations including: receiving, via a user interface, a first identification of a first accessory to be tried on by a user in an augmented reality environment, receiving, via the user interface, a second identification of a second accessory to be tried on by the user in the augmented reality environment, receiving a live video stream of the user, receiving a request via the user interface for a live compare session in the augmented reality environment, based on the request, loading a first 3-dimensional rendering system instance and a first product node tree for the first accessory, based on the request, loading a second 3-dimensional rendering system instance and a second product node tree for the second accessory and displaying, in the live compare session and based on the first 3-dimensional rendering system instance and the first product node tree, the live video stream of the user having the first accessory and displaying, in the live compare session and based on the second 3-dimensional rendering system instance and the second product node tree, the live video stream of the user having the second accessory.

BRIEF DESCRIPTION OF THE FIGURES

In order to describe the manner in which the above-recited and other advantages and features of the disclosure can be obtained, a more particular description of the principles briefly described above will be rendered by reference to specific embodiments thereof which are illustrated in the appended drawings. Understanding that these figures depict only exemplary embodiments of the disclosure and are not therefore to be considered to be limiting of its scope, the principles herein are described and explained with additional specificity and detail through the use of the accompanying drawings in which.

DETAILED DESCRIPTION

In accordance with some embodiments of the disclosed subject matter, mechanisms (which can include systems, methods, devices, apparatuses, etc.) for providing an accurate graphical representation of accessories based on the orientation and movements of a user during a virtual try-on session. This disclosure describes a system in which a user can select multiple accessories to try on virtually and then generates a "live compare" session in which the user can simultaneously view at least two, and potentially more, live stream videos of the user in which each respective live stream shows a different accessory.

Figure 1:
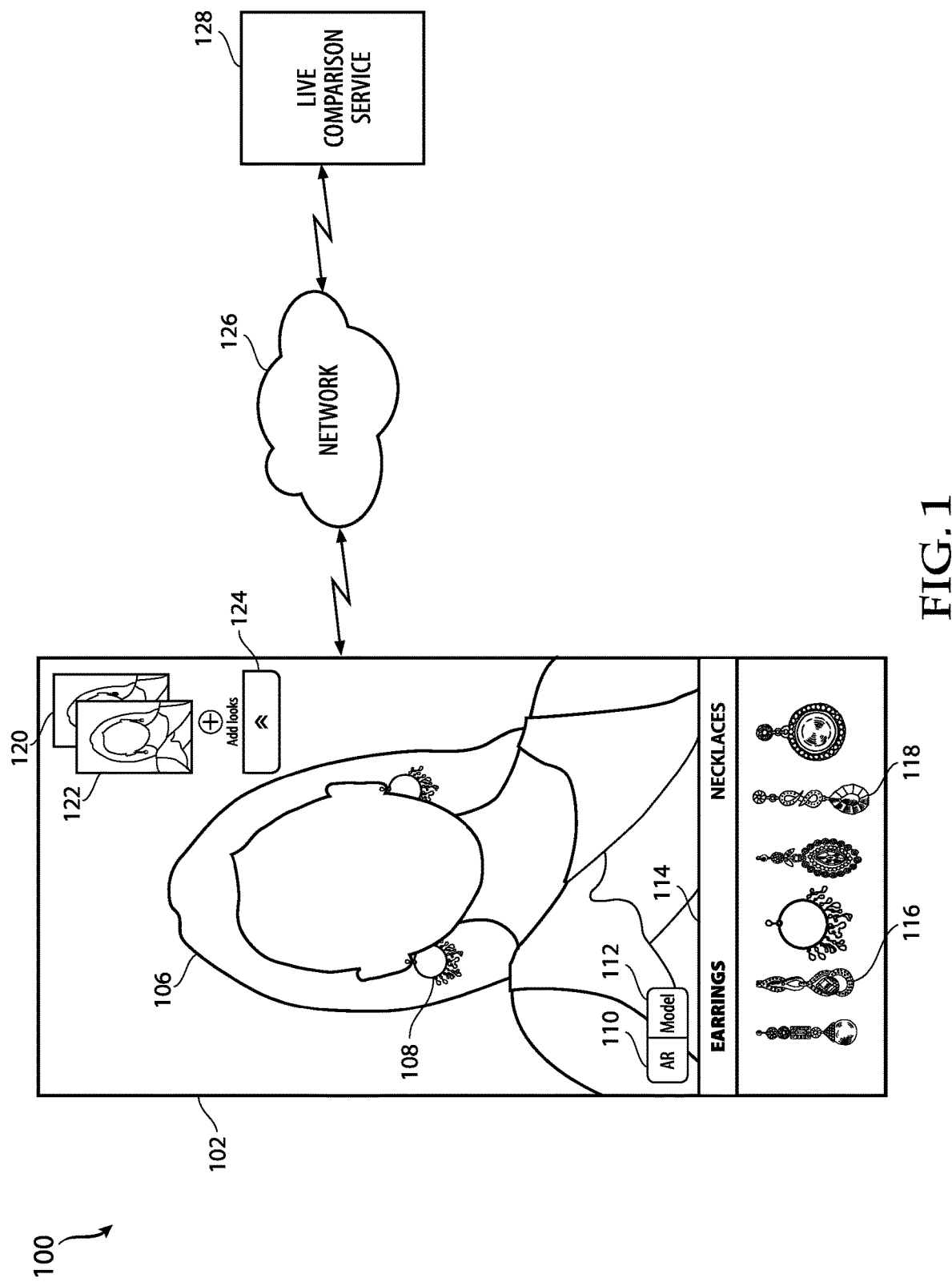
FIG. 1 shows an illustrative example of a user interface environment in which various embodiments can be implemented.

FIG. 1 shows an illustrative example of a graphical user interface 100 in which various embodiments can be implemented. In the environment 100, a user, via a user computing device, can select multiple accessories 116, 118 and initiate a live comparison session. The live comparison session can be generated from a website via a browser on the user computing device, from a progressive web application, or an application downloaded on a user device. The computing device can include hardware, firmware, and/or software, and can take any of a variety of form factors. Typical examples of such form factors include laptops, smartphones, small form factor personal computers, personal digital assistants, rackmount devices, and so on. In an embodiment, the computing device includes one or more peripheral devices, such as a touchscreen display or other display element (e.g., screen, monitor, etc.), a camera, multiple cameras, a lighting element (e.g., flash, light-emitting diode (LED), etc.), and the like.

It is noted also that while the particular objects are presented on the user interface, that the manner in which a user can interact with the system can vary. For example, user interactions can include interacting with the visual object on a touch sensitive screen, an object on a display can be chosen via a mouse interaction, the system can process a spoken dialog interaction, a multimodal interaction, a gesture interaction, an interaction indicated by the movements of a mobile device, and so forth. The interactions disclosed herein will typically be from the standpoint of a visual object but any interaction can also take one or more of the various forms described above.

In an embodiment, the user computing device includes a live comparison application 100 that may be used to access a virtual try-on service to obtain one or more graphical models that may be used to render accessory graphical representations, such as accessory graphical representation 108, on a user graphical representation displayed on the user interface 102. For instance, through the user computing device, a user may select multiple accessories 116, 118 and then request a live comparison session application to cause the user computing device to execute the application and present, via a display element of the user computing device, the user interface 102. The application can cause one or more peripheral devices of the user computing device to be activated in order to support a live comparison session. For instance, the live comparison session application may cause the user computing device 100 to activate a camera and lighting element of the user computing device 100 to capture live images or video of the user for the live comparison session.

In an embodiment, through the user interface 102, the user may be presented with graphical representations of accessories 114 that may be rendered 108 on to the user graphical representation 106. The live comparison session application may obtain these graphical representations of accessories locally or from a server-based system 128 over a network 126. The live comparison service 128 can further provide additional data that may be used to render an accessory graphical representation, such as accessory graphical representation 108, on one or more features of the user graphical representation 106. For example, the additional data may include metadata that specifies a classification for the accessory (e.g., earring, necklace, tikka, etc.), possible locations for the accessory on a user, actual size information for the accessory, and the like. In an embodiment, the additional data includes an accessory graphical model that may be used by the virtual try-on session application to accurately render an accessory graphical representation on to the user graphical representation 106.

In an embodiment, if the user selects an accessory from the selection pane 114 of the user interface 102, the live comparison session application 128 can transmit information regarding this selection, as well as any user position and orientation data, to a separate service to obtain data that may be used to render the accessory graphical representation 108 on the user graphical representation 106.

In the live comparison application, the user can select multiple different accessories and add them to the live comparison session. For example, the user may select a set of earrings 108, and a second accessory 116. While the user is viewing the second accessory on their live model 106, the user could "drag and drop" the image 122 to the "add looks" area of the user interface 102. The effect of this interaction is to add another accessory to a set of accessories that will be presented to the user in a live comparison. Image 120 and image 122 are shown illustrating that the user has selected two looks for the comparison session. The manner in which the user can add accessories to a pool of accessories or live comparison session can be varied as noted above. For example, the user can click on an object, gesture with their hands, drag and drop an image, and so forth. Any user interaction is possible for the purpose of indicating that a particular accessory is desired to be viewed and a "live comparison" mode.

Disclosed below are various processes for utilizing user position and orientation data for generating an augmented reality image of the user and a live stream mode. The user device can use a camera(s) in, for example, a video selfie mode, to generate the live stream. The live stream cam be combined with an accurate three-dimensional and moving representation of the selected accessory. The approach disclosed herein with respect to a "live comparison" mode utilizes multiple three-dimensional rendering the user or systems simultaneously being used to present multiple live in streams of the user in which each respective live stream is presented in a portion of the user interface and illustrates a respective accessory.

Figure 2:
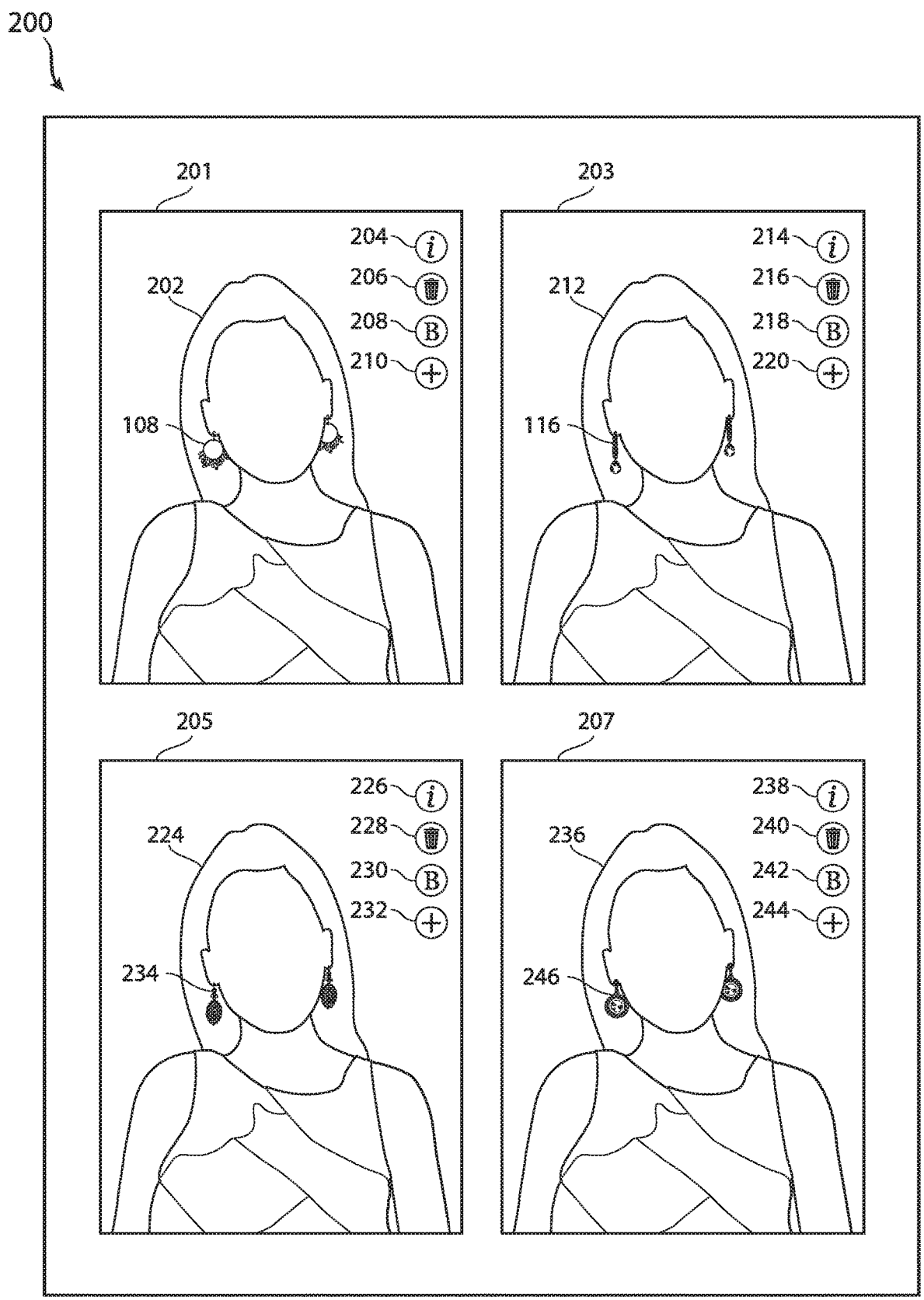
FIG. 2 shows an illustrative example of a user interface in which a live compare of different accessories is presented to a user.

In a user interface shown in FIG. 1, users also can select an augmented reality mode 110 or a model mode 112. Object 124 represents further options such as the ability of the user to click or interact with the object to thus cause the presentation of the live comparison of the various chosen accessories. As a result of interacting with such an object 124, the system could then present on the user interface multiple live streams as is shown in FIG. 2. FIG. 2 shows a first portion 201 of the user interface 200. This portion includes a live video stream of the user 202 plus a first chosen accessory 108. Selectable options are presented for further tasks associated with the first accessory 108. For example, the user might interact with the object 204 to receive further information about the first accessory 108. The user may select an object 206 to delete the accessory 108 from the pool of live comparison accessories. The user might interact with a buy object 208 to purchase the associated accessory 108 (such as through Apple Pay, Google Pay, PayPal or any other payment mechanism). The user may interact with a plus object 210 to add the associated accessory 108 to a shopping cart. The options can also include options to change or alter any accessories or the group of accessories. For example, the user might want to see all the accessories shown in the comparison session in a larger size, or in a different color or different metal (gold rather than silver).

The user interface 200 includes a second portion 203 with the live video stream of the user 212 wearing different accessories 116. A camera on the user device can receive the live video stream, and duplicate the stream so that each portion of the user interface 200 receives a respective stream of the live video to add its respective accessory. The duplication of the live stream can also occur on a network-based server 128. Optional objects 214, 216, 218, and 220 are presented for performing prospective tasks associated with the accessory 116. A third portion 205 of the user interface 200 shows the respective live video stream 224 of the user with a different accessory 234 and optional objects 226, 228, 230, and 232. A fourth portion of the user interface 207 shows another live stream of the user 236 with an accessory 246 with objects 238, 240, 242, and 244. The user interface 200 shown illustrates how a single live video stream of the user can be processed into multiple live video streams, each respective video stream having a respective accessory. As the user moves, each of the portions of the user interface 201, 203, 205, 207 will simultaneously move and show how the respective accessory 108, 116, 234, 246 will move with the user, thus enabling the user to easily compare the accessories and make purchasing decisions.

With respect to FIG. 2, if the user were to select a total of 5 or more accessories for use in the live comparison, the system could enable the user to scroll across multiple screens to see additional portions of the user interface 200. This will likely occur where an individual portion that is presented 201, 203, 205, 207 might be too small for user viewing. For example, the user can create a "look" for themselves by trying on various accessories and adding the accessory to the look in a live compare component. After the user adds the various "looks" that they desire to compare, the user can enter a "live compare" screen or a "live compare" mode in which the system simultaneously presents their live video stream in multiple different portions of the user interface in which each portion shows a respective product that they have added corresponding to a respective "look." Each of the "looks" are shown side-by-side on live video in real time. In this manner, the user can compare the looks and products and decide which one they want to buy.

Each of the "looks" shown in live compare, i.e. each portion, could show more than one accessory if the "look" added involves multiple accessories. For example, if an earring and a necklace are chosen, they can be presented simultaneously, or an earring and a climber could be presented simultaneously or individually.

As noted above, one of the selectable options enables the user to delete a respective accessory. Upon the user deleting a respective accessory, that video stream could be deleted and the user interface can include the remaining number of accessories the user has selected. The user can then either purchase accessories directly or add to a virtual shopping cart or basket of the "looks" that the user likes and thus the products associated with the look that they desire to purchase. In another aspect, the system could provide an option where users could share a comparison on social media. The user could share a snapshot of the compare or a recurring video of the person moving their head from side to side to show the accessory, for example. Upon such a request, the system could identify a live comparison snapshot or portion of video and "post" it on a social media site like Instagram, Facebook, Twitter, and so forth. The user could then add a statement to ask for comments on which accessory to buy.

In another aspect, the user could mix and match accessories. For example, the user might have chosen two scarfs and three sets of earrings. The user interface 200 might enable the user to click and drag a scarf from image 201 to image 203 such that the user can see how that scarf would look with the various sets of earrings. Assume image 201 includes a scarf accessory. The user might be able to drag the entire image 201 and drop it onto image 203 which would cause the scarf and the earrings 116 to be shown on the same live video stream of the user. In this manner, the user interface is configured to enable the mixing and matching of various accessories so enable the user to play with different "looks" in ways not previously possible. This can also occur in the context of the live comparison session or in an individual session.

There are several technical improvements to the live comparison concept described above over previous approaches. First, the live comparison technology allows users to try out different looks and view them in parallel or at the same time on multiple views of their live video stream. This approach uses less energy and is more efficient in that the user in this scenario does not have to separately view respective accessories they might desire to purchase. In other words, more battery power would be required to separately view each "look" in a serial manner on a user device. By viewing the various accessories in a live comparison view simultaneously, the system can quickly enable the user to arrive at a chosen accessory or accessories to purchase. The new approach will thus use less battery power by presenting multiple scenes simultaneously. This results in less computer processing cycles, less computer time needed, less electricity used by the system, and so forth.

In another aspect, the disclosed approach also allows users to compare different looks under exactly identical lighting conditions and background environments. Inasmuch as the live stream is duplicated in each of the respective portions of the user interface, this allows an equal comparison of the various accessories under the same conditions. The live comparison approach allows the user to add any number of looks and provides a seamless comparison approach between them. The user interface adjusts for added looks, converting to a scrolling mode with the user can scroll from one group of "looks" to another. The live comparison approach allows for users to compare different looks to identical body profile positions because each respective "look" uses the same live video feed and thus the same body movement and body profile. Again, this allows comparisons to be upon the same basis amongst the different accessories.

In another aspect, the system could use different feeds or different cameras on a mobile device to present a different video stream of the user in different portions of the comparison session.

In yet another aspect, the system includes the technical feature of enabling the user to zoom in or out of one of the respective looks in the live comparison mode. If the user applies a single gesture or other interaction to zoom in or out of a particular "look", say look 203 in FIG. 2, the system can respond by providing similar or identical zooming in or out for all of the looks or views of the user interface. This enables the user to easily compare all of the looks from the view desired whether it is close up or zoomed out. The system might also adjust to convert to a scrolling mode in which, for example, the user interface shows images 201 and 203 which the user might need to scroll to see images 205 or 207. This also improves the operation of a computing system by enabling a more efficient use of computer resources such that the user can simultaneously zoom in or zoom out of the live comparison views and make a purchasing decision more efficiently and quickly than would otherwise be possible using traditional approaches.

Figure 3:
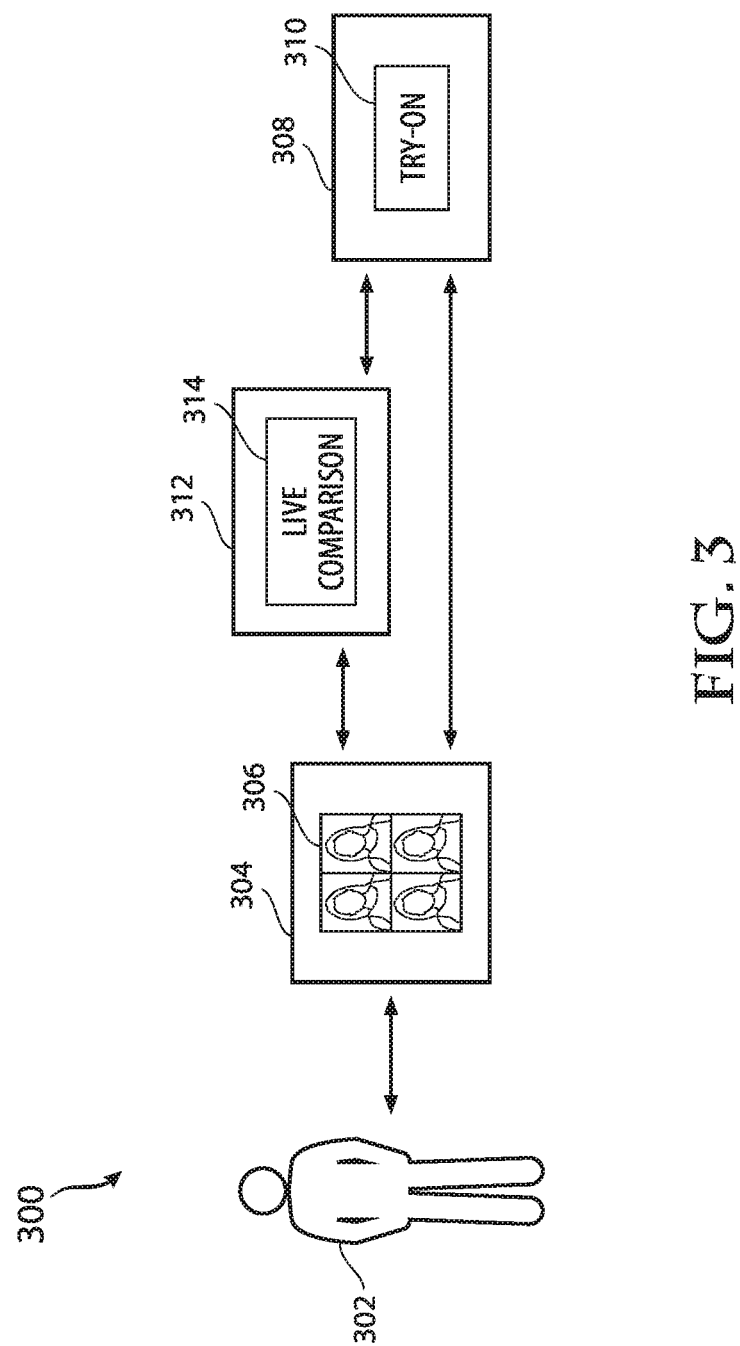
FIG. 3 shows a live compare environment receiving data for enabling 3-dimensional renderings in different portions of the user interface.

FIG. 3 illustrates an example in which a system 300 can include one or more of a user 302 interacting with a device 304 to obtain a live comparison view 306. A network-based server 308 can include "try-on" technology 310 that enables the generation of each respective 3-D look or view 201, 203, 205, 207 from FIG. 2 (represented as view 306 in FIG. 3). The "try-one" system 308 can provide the 3-D views of a respective accessory on a live stream of a user. In one aspect, the live comparison user interface 306 can be generated by a live comparison application or system 312 interacting with a "try-on" system 308. The "try-on" system 308 can generate individual 3-D renderings for respective accessories and pass the data onto a "live comparison" system 312 operating a live comparison application 314 which can then utilize that data to provide the user with the live comparison user interface 306. More details about the "try-on" system 308 can be found from application Ser. No. 16/731,716, filed Dec. 31, 2019, and incorporated herein by reference.

Figure 4:
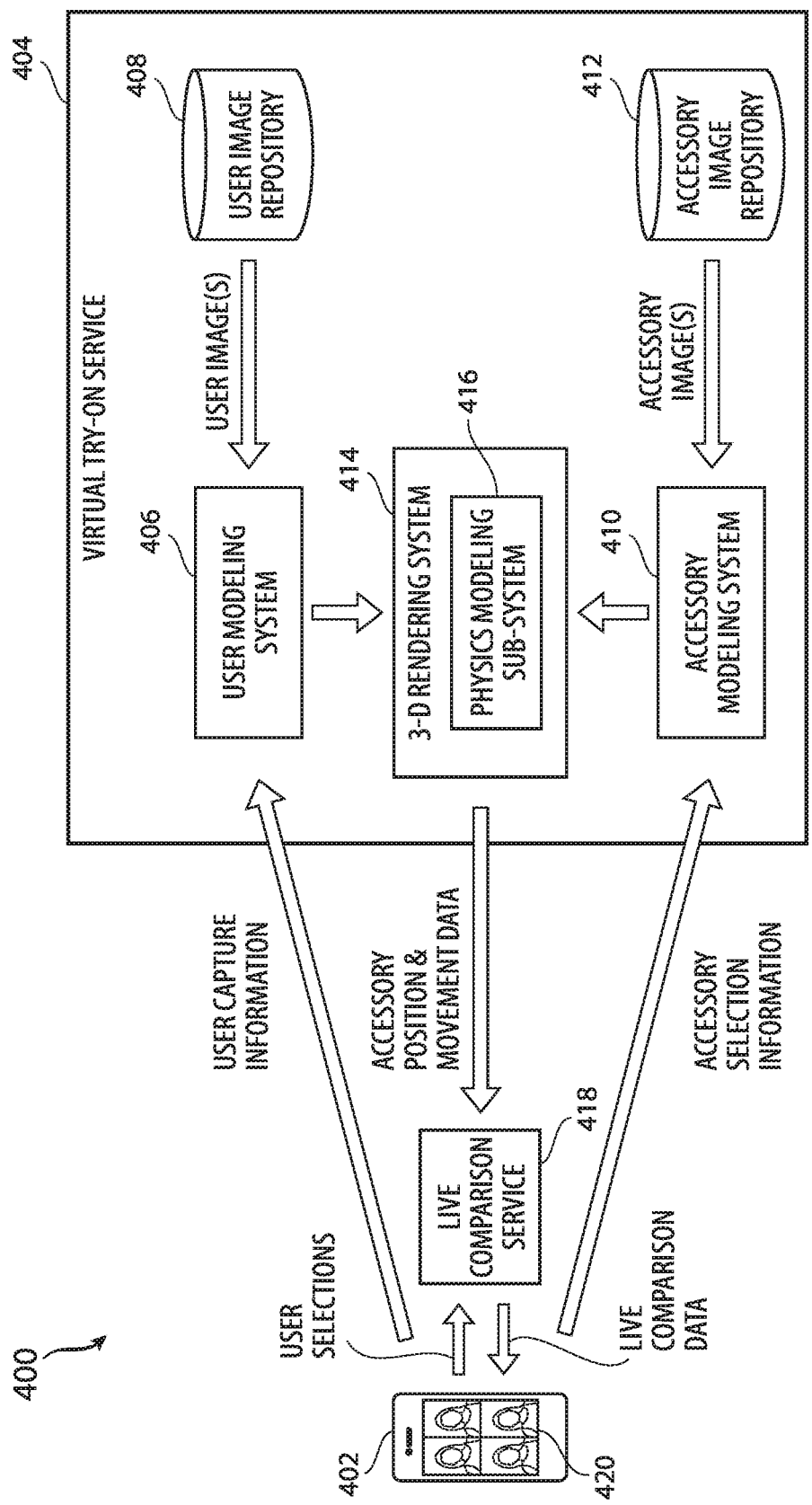
FIG. 4 shows an illustrative example of an environment in which an accessory modeling system generates an accessory graphical model comprising a set of nodes and connectors in accordance with at least one embodiment.

FIG. 4 shows an illustrative example of an environment 400 in which a live comparison service 418 receives data from a virtual try-on service 404 utilizing user capture information and accessory selection information received from a user device 402 having a user interface 420 to generate accessory position and movement data. The generated position and movement data is used for presentation of an accessory graphical representation on the user graphical representation 420 such that a live comparison of different looks can be achieved in accordance with at least one embodiment. For example, the position and movement data represented data used to show how a set of earrings would look as the user tilts their head or moves from side to side. Each accessory will move in a certain way given the modeling provided from the try-on service 404.

While the virtual try-on service 404 is described next, it is noted that this description is in the context of the virtual try-on data being transmitted to a live comparison service 418 which presents multiple looks or views, each look or view corresponding to a respective accessory. As a result, a user can simultaneously compare the different accessories and make purchasing decisions efficiently.

In the environment 400, a live comparison session application executing on a user computing device 402 may transmit user capture information to a user modeling system 406 of the virtual try-on service 404. The user capture information can include a live video feed of the user captured using one or more peripheral devices of the user computing device 402 (e.g., cameras, lighting elements, microphones, etc.). The transmission of user capture information may, thus, be performed over a live streaming session between the user computing device 402 and the virtual try-on service 404 and/or live comparison service 418.

In response to obtaining the user capture information, the user modeling system 406 can determine whether other existing images of the user and/or user graphical models are available. For instance, the user modeling system 406 may obtain, from a user image repository 408, any available user images that have been previously processed to generate or update a user graphical model. From the user image repository 408, the user modeling system 406 may also obtain an existing user graphical model, which may be used by a 3-D rendering system 414, which can operate a physics modeling sub-system 416, to determine placement of an accessory graphical representation on to a user graphical representation presented on the user computing device 402. These existing images and models may be used as references for determining any changes to the position and orientation of the user during the live comparison session 420.

If a user graphical model is not available for the user, the user modeling system 406 can generate a new user graphical model using the capture information obtained from the user computing device 402 and any available user images from the user image repository 408. For instance, using the captured images of the user and/or the images obtained from the user image repository 408, the user modeling system 406 may generate a set of user body nodes corresponding to various facial and body features of the user. Further, the user modeling system 406 may calculate the size and depth of the various facial and body features of the user. As noted above, the image of the user may be placed as the background for a 3-D rendering view and rays may be cast from each of the reference body nodes, from which the distance between these rays is computed at different depths. This may be performed by the user modeling system 406 in order to determine the depth of the user from the camera of the user computing device 402.

In an embodiment, the user modeling system 406 uses the user capture information to determine the orientation and position of the user relative to the position/orientation of the camera of the user computing device 402. Based on the user capture information and using the user graphical model, the user modeling system 406 may compute the x, y, and z-angles corresponding to the user's orientation and position. The user modeling system 406 can update the user graphical model based on these computed angles such that any accessory graphical representations may be updated in accordance with the change in orientation and position of the user.

In an embodiment, the user modeling system 406 generates a set of occlusion nodes for the user graphical model, which may be used to hide portions of the accessory graphical representation based on the position and orientation of the user. To generate the occlusion nodes, the user modeling system 406 may create generic 3-D geometries of a generic user (e.g., face, body, etc.). In response to obtaining the user capture information and/or existing user images from the user image repository 408, the user modeling system 406 can modify these three-dimensional geometries based on the computed orientation and depth of the user. The updated 3-D geometries are subsequently associated with a transparent texture via an alpha layer and the occlusion nodes are generated from this texture. The user modeling system 406 can provide, to a 3-D rendering system 414 of the virtual try-on service 404, the user graphical model and the set of occlusion nodes generated based on the updated 3-D geometries.

The live comparison session application, via the user computing device 402, can also provide accessory selection information to an accessory modeling system 410 of the virtual try-on service 404 to determine how an accessory graphical representation is to be presented on the user graphical representation. The accessory selection information can include an identifier corresponding to the selected accessory, as well as other information that may be used to determine where, on a user body, the accessory is to be applied. In response to obtaining the accessory selection information, the accessory modeling system 410 can obtain, from an accessory image repository 412, one or more 2-D images of the accessory.

In an embodiment, the accessory modeling system 410 performs a set of operations to generate, using the 2-D images of the accessory, an alpha channel image of the accessory that may be used to ensure that only the accessory in the image is displayed and the background of the image is transparent when rendered. This alpha channel image may be used to create one or more plane render nodes in the 3-D rendering system 214 by using the alpha channel image as a texture. In an embodiment, the accessory modeling system 410 obtains, from an accessory database or other repository, the actual dimensions of the accessory. These dimensions may be provided to the 3-D rendering system 414, which may provide these dimensions to the virtual try-on session application for use in determining placement and scaling of the accessory graphical representation relative to the user graphical representation. In an embodiment, if a 3-D graphical model of the accessory is available, the accessory modeling system 410 can provide this 3-D model to the 3-D rendering system 414.

In an embodiment, the 3-D rendering system 414 of the virtual try-on service 404 uses the user graphical model and the occlusion nodes provided by the user modeling system 406, as well as the accessory graphical model provided by the accessory modeling system 410, to determine a set of positions for the nodes of the accessory graphical model. These positions can be used to determine how to graphically represent the selected accessory onto the graphical representation of the user presented on the user interface of the user computing device 402. For instance, the nodes corresponding to the accessory graphical model are placed on the corresponding user body nodes of the user graphical model. For example, if the accessory graphical model is a representation of an earring, the nodes of the accessory graphical model can be placed on to user body nodes corresponding to the user's ears. The nodes of the accessory graphical model can be placed at the same depth as the previously computed user depth identified by the user modeling system 406. Further, the accessory graphical model can be scaled by the 3-D rendering system 414 based on the depth of the user, as determined by the user modeling system 406.

In an embodiment, the 3-D rendering system 414 further places the nodes of the accessory graphical model at the appropriate angle based on the determined orientation of the user, as determined by the user modeling system 406. This ensures that the angle of the accessory, as presented in the user interface, is constant with respect to the orientation of the user. Further, as the user's orientation changes and is determined by the user modeling system 406, the nodes of the accessory graphical model may be positioned with respect to the user's change in orientation.

The 3-D rendering system 414 can further prioritize the occlusion nodes provided by the user modeling system 406 over the nodes of the accessory graphical model. This may ensure that wherever an occlusion node and an accessory graphical model node overlap, the portion of the accessory graphical representation corresponding to the accessory graphical mode node is hidden from view on the user interface. As the user's orientation changes, the 3-D rendering system 414 can change the render ordering of the occlusion node and the overlapping accessory graphical model node. For example, as the user rotates their face to the right, the graphical representation of the left earring is displayed and unobscured by the user's facial features (e.g., the node corresponding to the left earring is given a higher render priority). Alternatively, as the user rotates its face to the left, the graphical representation of the left earring is obscured by one or more facial features of the user (e.g., the occlusion node is given a higher render priority). In the live comparison context, the try-on system 404 can send multiple sets of data for combining into the user interface 420 to enable the user to simultaneously view different looks. Thus, the occlusion nodes may obscure the corresponding accessory graphical nodes based on their relative render priority order, as well as their relative depth.

In an embodiment, the 3-D rendering system 414 includes a physics modeling sub-system 416 that can be used to determine how to model the movement of the accessory graphical representation in response to detection of a user's movement during the virtual try-on session. For instance, in response to detecting a change in the position and orientation of the user, the physics modeling sub-system 416 can apply gravitational effects to the accessory graphical nodes corresponding to elements of the accessory that are able to move freely. Additionally, based on the change in orientation, the physics modeling sub-system 416 may calculate the angular acceleration for these accessory graphical model nodes, which is added to the calculated velocity of these nodes. The results of these calculations are used to determine the new position of the accessory graphical model nodes. In an embodiment, a gravitational factor is fine-tuned based on the 3-D rendering system 414 view and the rendering capabilities of the user computing device 402 (e.g., frames per second that can be presented via the user interface, etc.). The gravitational effect may be considered independently for each axis of rotation (e.g., x, y, and z axes).

In an embodiment, for accessories including a set of elements that are fixed and other elements that are permitted to move and/or rotate freely, the 3-D rendering system 414 can decompose the accessory graphical model to generate additional nodes that may be used to represent each of these components. The physics modeling sub-system 416 may apply the physics model (e.g., application of the gravitational factors, calculation of velocity and angular acceleration, etc.) to the accessory graphical nodes corresponding to the elements of the selected accessory that are allowed to move and/or rotate. Further, the physics modeling sub-system 416 may apply different friction/dampening factors to each of the accessory graphical model nodes based on their identified range of motion. The system 416 does this in each instance where multiple images are presented with respective accessories in a comparison mode.

The 3-D rendering system 414 can provide, to the virtual try-on session application of the user computing device 402, accessory position and movement data generated using the updated accessory graphical model to cause the virtual try-on session application to render the accessory graphical representation on to the user graphical representation in accordance with the updated accessory graphical model. Thus, as the user moves during the virtual try-on session, the virtual try-on session application can obtain this data from the 3-D rendering system 414 and graphically represent the accessory on to the user graphical representation accurately (e.g., changing scale, simulating movement, hiding or presenting elements of the accessory, etc.).

It should be noted that some or all of the components of the virtual try-on service 404 configured to generate and update the user graphical model and accessory graphical model in order to allow for an accurate accessory graphical representation as the user moves during the virtual try-on session can be implemented by the virtual try-on session application and executed using hardware and software of the user computing device 402. Thus, rather than transmitting user capture information and accessory selection information to the virtual try-on service 404, the virtual try-on session application can use this data as input to one or more processes to determine how to render the accessory graphical representation on to the user graphical representation presented via the user interface of the user computing device. For the live compare context 418, the try-on service 404 will provide the data for multiple simultaneous views of accessories during the live compare session with the user.

Generally speaking, the live comparison service 418 receives user video frames at a high frames per second rate from the try-on service 404. While no specific frame rate is considered essential to the concepts disclosed herein, the present inventors have been able to achieve frame rates of 40-45 frames per second. Other ranges are contemplated. For each video frame, the live comparison service 418 receives one or more of the following data from the try-on service 404: the user's anchor position in a 3-D system with respect to the image in the frame; the user's orientation in a 3-D system for each frame; the occlusion masks (3-D geometries) that need to be placed along with their position and orientation with respect to the user anchor position and orientation; the position where the accessories or apparel need to be placed if the positions changed with respect to the user's anchor position in a 3-D system; and at least one mini-physics engine associated with each of the products.

Figure 5:
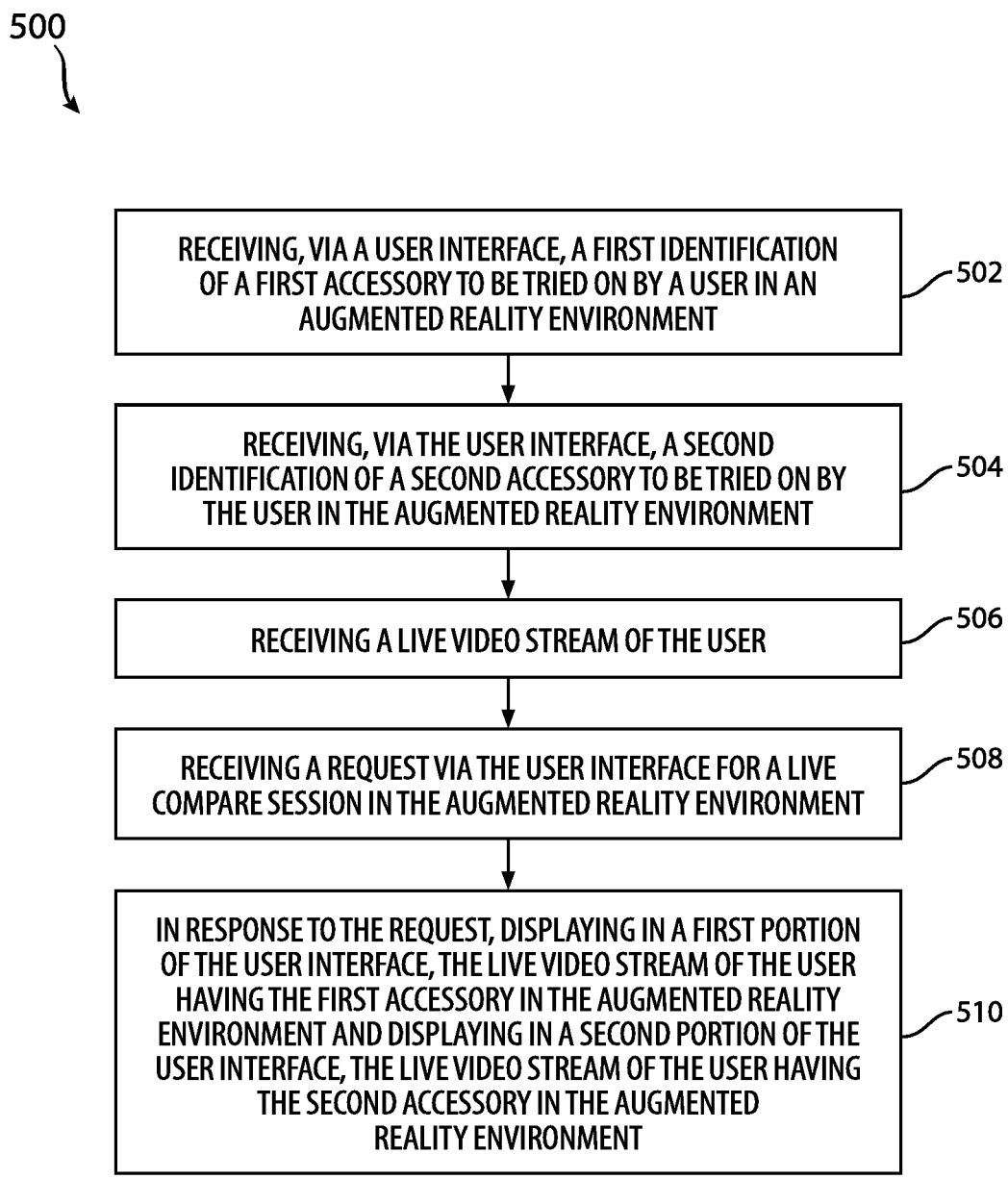
FIG. 5 shows an illustrative example of a method of providing a live comparison user interface environment.

FIG. 5 illustrates a method embodiment related to presenting a live-comparison service. An example method includes one or more of the following steps in any order: receiving, via a user interface, a first identification of a first accessory to be tried on by a user in an augmented reality environment (502), receiving, via the user interface, a second identification of a second accessory to be tried on by the user in the augmented reality environment (504), receiving a live video stream of the user (506), receiving a request via the user interface for a live compare session in the augmented reality environment (508) and, in response to the request, displaying in a first portion of the user interface, the live video stream of the user having the first accessory in the augmented reality environment and displaying in a second portion of the user interface, the live video stream of the user having the second accessory in the augmented reality environment (510). Receiving the live stream of the user can occur via a camera or cameras configured in the user device which receives, in selfie mode or another mode, live video of the user and provides that live video to the service or services described herein for configuring and presenting the live comparison.

Additional accessories can be identified by the user to yield a set of accessories, the set of accessories including accessory selections adding up to a set number. For example, the user may select 3 or 5 accessories. Whatever the "set number" of accessories is for the set, can cause that same number (3 or 5) of different live comparison views. The sizing and shape (or the type) of the set of live comparison views can vary depending on whether they are side by side (say if there are two or three) or in two rows as is shown in FIG. 2 where there are 4 accessories to compare. The choice to show more live comparison views in a single screen or to switch to a scrolling interface can depend on one or more of the number of accessories chosen, the type of accessory (is it large and easy to see or small like an earring), the lighting for the views, the size of the live stream of the user (are they close up or far away). The system could accept hundreds of choices of accessories and can present hundreds of "looks" for live comparison. In one aspect, the system can also enable the user to reorder the looks. For example, a user might desire to have look number 3 placed next to look number 12. The user could "cut and paste" a look from one portion of the live comparison and place it next to another look so that the user can see the two side by side. The system may change the "type" of live comparison view (2×2, 3×3, scrolling, etc.) based on the number of looks or accessories or based on other factors.

In order to enable the larger number of looks to be added to the system, this disclosure provides a technical optimizations. For example, the system can load a 3-D rendering system instance and a corresponding products node tree only with the view corresponding to them becomes visible on the user interface for the user. The system could destroy those node trees when the view becomes invisible as the user to scroll through the various looks or views. The system could anticipate, using machine learning techniques, the actions of the user in terms of scrolling, zooming in, zooming out, deletions, and so forth. The system can in this respect preemptively load the necessary 3-D rendering system instance and product node trees for looks that are not viewable yet but that are predicted to be viewable very soon based on a scroll action or a predicted action of the user. In this manner, there would be no lag or delay in the look and how it can be viewed in a live comparison mode as it appears on the user interface.

In another aspect, the system could cache product node trees in memory to allow for faster scrolling. The system could also re-use 3-D rendering system instances associated with a user when a look or a portion of the live compare session gets hidden or made invisible by the user scrolling. For example, if a new portion is about to be presented because the user is scrolling, the system could reuse a system instance for a portion that is being scrolled out of view for the portion that is coming into view. In another aspect, the system could use lighter weight lighting environment maps for each 3-D rendering system.

Upon the request for the live compare session in the augmented reality environment, the method can include displaying the live video stream of the user multiple times such that a number of portions of the user interface each displaying a respective live video stream with a respective accessory from the set of accessories equals the set number. The user interface further can include at least one of a delete object, a purchase object, an information object, and a place-in-shopping-cart object in connection with each portion of the user interface that displays the live video stream and an associated accessory. These are example objects in any configuration or structure of these objects and applied. For example, the system can provide a drop down menu, applicable virtual buttons, a multimodal interface, a speech-based interface, a gesture-based interface, and so forth.

When the set of accessories meets a threshold, the method further can include presenting a scrolling user interface which enables the user to scroll through different portions of the user interface which respectively each present the live video stream of the user plus a respective accessory. Scrolling can occur vertically, horizontally, diagonally, or in any manner.

The threshold in one aspect can relate to the set number of accessory selections causing a respective size of a respective portion of the user interface that presents a live video stream to be too small for viewing and comparison by the user. The purpose of the live compare session is to enable the user to see simultaneously different accessories being worn by the user in a live video stream. However, if each individual look is too small, the user might not be able to adequately compare the looks. The threshold regarding whether to convert to a scrolling user interface can be based on one or more of the size of each respective user image in the respective looks, the type of accessory, the size of accessory, how an accessory looks giving the lighting context, and so forth. Any one or more of these parameters or features can be considered when determining whether to a respective looks is too small in a live comparison mode and whether larger looks should be presented in a scrolling user interface.

Displaying the live video stream in the first portion of the user interface with the first accessory and displaying the live video stream in the second portion of the user interface with the second accessory can include generating a respective 3-D rendering view for each respective portion of the user interface. The respective view can be presented through loading a 3-D rendering system instance and a corresponding product node tree for the respective accessory in a respective look. The respective 3-D rendering view can include one or more of a lighting environment, a user's anchor position, a created anchor node, an occlusion node based on occlusion mask geometries, and a respective 3-D node tree for a respective accessory.

For each frame of the respective 3-D rendering view, the method can include using one or more of an image set as a background, an updated anchor node position based on an updated user's anchor position, an updated anchor node orientation based on a received user orientation, updated product positions and updated occlusion mask node updated geometries, updated positions and/or an updated orientation. Displaying the live video stream in the first portion of the user interface with the first accessory and displaying the live video stream in the second portion of the user interface with the second accessory can include receiving a first physics engine associated with the first accessory and receiving a second physics engine associated with the second accessory. Generating a respective 3-D rendering view for each respective portion of the user interface can be based the physics engine associated with the accessory for that portion.

Figure 6:
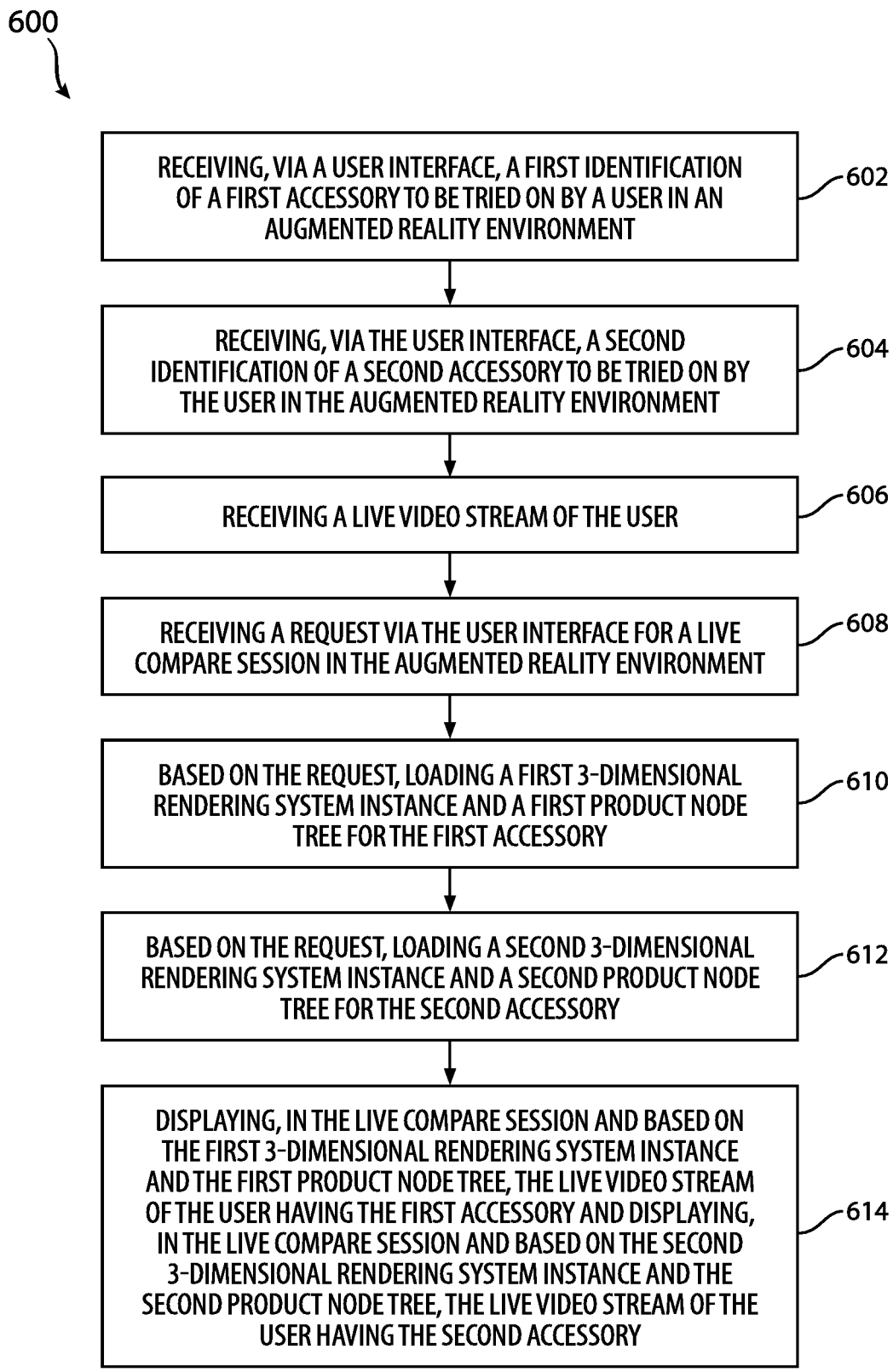
FIG. 6 shows another illustrative example of a method of providing a live comparison user interface environment.

FIG. 6 illustrates another example method. An example method can include one or more of the following steps, in any order: receiving, via a user interface, a first identification of a first accessory to be tried on by a user in an augmented reality environment (602), receiving, via the user interface, a second identification of a second accessory to be tried on by the user in the augmented reality environment (604), receiving a live video stream of the user (606), receiving a request via the user interface for a live compare session in the augmented reality environment (608), based on the request, loading a first 3-D rendering system instance and a first product node tree for the first accessory (610), based on the request, loading a second 3-D rendering system instance and a second product node tree for the second accessory (612) and displaying, in the live compare session and based on the first 3-D rendering system instance and the first product node tree, the live video stream of the user having the first accessory and displaying, in the live compare session and based on the second 3-D rendering system instance and the second product node tree, the live video stream of the user having the second accessory (614).

In another aspect, the live compare system, session or mode includes creating a 3-D rendering view for each "look" chosen by the user or added to the live compare system. Each 3-D rendering system that corresponds to each 3-D rendering view can include one or more of the following. The system can create a lighting environment that is close to, or is similar to, the user's current environment. This can be achieved by the system of evaluating lighting conditions or characteristics of the live video stream of the user and then creating a similar lighting environment for each look. The system can create an anchor node. The system can create occlusion nodes based on the occlusion mask geometries received from the try-on system 308. The system can load 3-D node trees for the products associated with the look into a current 3-D system.

In another aspect, the system can create a lighting environment for the various comparison mode images that differs from the actual lighting environment for the user. The system could enable the user to request an alternate lighting environment which would be used for the comparison view. In one aspect, the system could present a comparison view of the same accessory in different view but with different lighting environments. In another aspect, other parameters could vary amongst the various views of the comparison mode. For example, the user could select an accessory and choose 4 different colors of the accessory for comparison.

For every frame passed from the try-on system 308, the information passed for each frame is used in each 3-D rendering system context. For example, the image from the frame is set as a background image, the anchor node's position is updated based on the passed-in user's anchor position, the anchor node orientation is updated based on the passed-in user orientation, the occlusion mask nodes' geometries, positions and orientation are updated based on the corresponding pass-in information, and the positions of the products are updated based on the position changes passed in. The physics engines associated with each of the products are executed to simulate appropriate motion for each product. Further details about the information that is generated and passed in to the live comparison system are found in the applications incorporated herein by reference.

Figure 7:
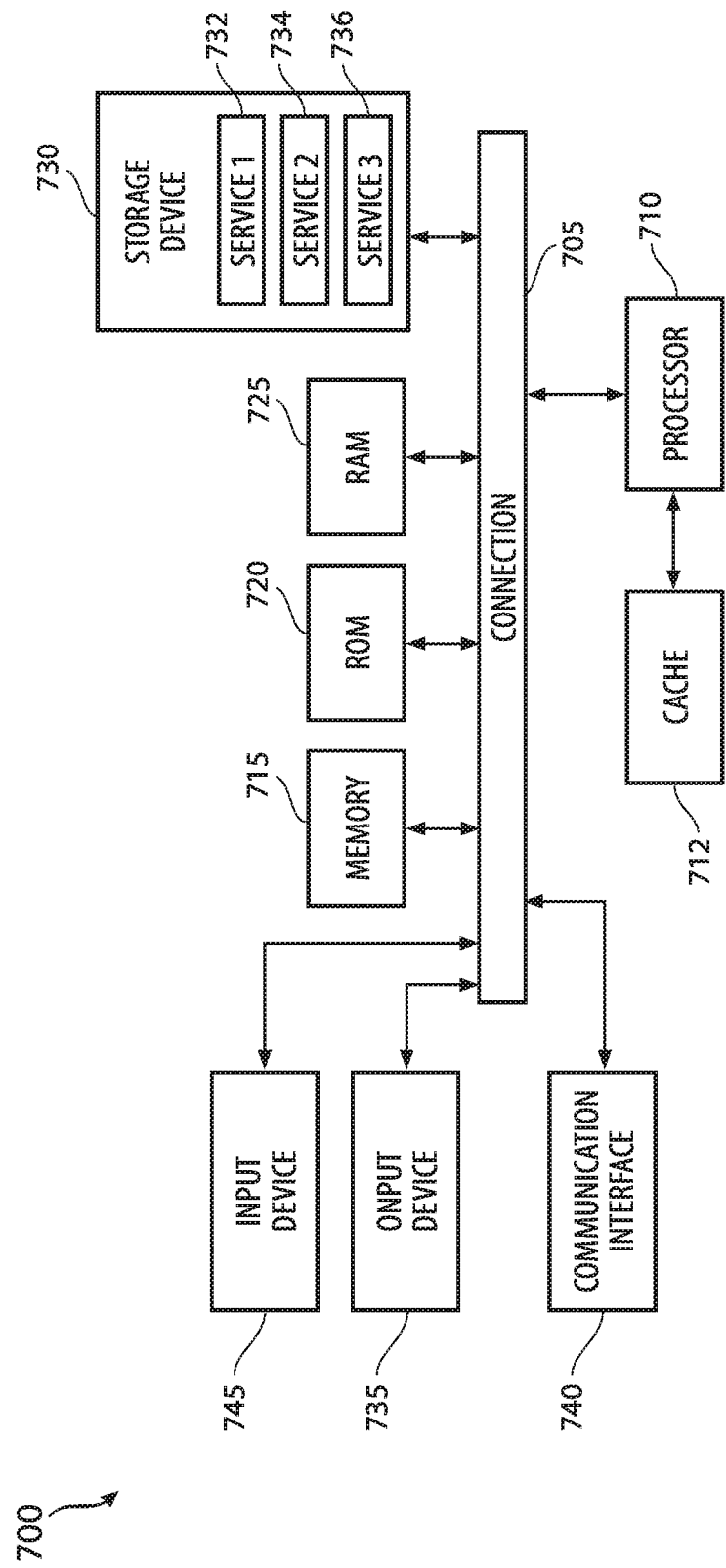
FIG. 7 shows an illustrative example of a computing system architecture including various components in electrical communication with each other using a connection in accordance with various embodiments.

FIG. 7 shows an illustrative example of a computing system architecture including various components in electrical communication with each other using a connection in accordance with various embodiments. In this example, FIG. 7 illustrates a computing system 700 (system 700) including components in electrical communication with each other using a connection 705, such as a bus. System 700 includes a processing unit (CPU or processor) 710 and a system connection 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric.

To enable user interaction with the device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se. In one example, using a protocol such as Bluetooth, the two devices may communicate directly with each other to manage the try-on session.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, smart mirrors, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method, comprising:
    receiving, via a user interface, a first identification of a first accessory to be tried on by a user in an augmented reality environment, wherein the first accessory comprises a first wearable accessory, first jewelry or first apparel;
    receiving, via the user interface, a second identification of a second accessory to be tried on by the user in the augmented reality environment, wherein the second accessory comprises a second wearable accessory, second jewelry or second apparel and wherein at least one additional accessory is identified by the user to yield a set of accessories having a set number of accessories;
    receiving a live video stream of the user;
    receiving a request via the user interface for a live compare session in the augmented reality environment; and
    in response to the request, displaying, in a first portion of the user interface, a first copy of the live video stream of the user having the first accessory in the augmented reality environment and simultaneously displaying, in a second portion of the user interface, a second copy of the live video stream of the user having the second accessory in the augmented reality environment resulting in the live video stream being displayed multiple times, the multiple times matching the set number of accessories, such that a respective portion of the user interface displays the live video stream with a respective accessory from the set of accessories.

2. The method of claim 1, wherein the user interface further comprises at least one of a delete object, a purchase object, an information object, and a place-in-shopping-cart object in connection with each portion of the user interface that displays the live video stream and an associated accessory.

3. The method of claim 1, wherein, when the set of accessories meets a threshold, the method further comprises presenting a scrolling user interface which enables the user to scroll through different portions of the user interface which respectively each present the live video stream of the user plus a respective accessory.

4. The method of claim 3, wherein the threshold relates to the set of accessories causing a respective size of a respective portion of the user interface that presents a live video stream to be too small for viewing and comparison by the user.

5. The method of claim 1, wherein displaying the live video stream in the first portion of the user interface with the first accessory and displaying the live video stream in the second portion of the user interface with the second accessory comprises generating a respective 3-dimensional rendering view for each respective portion of the user interface.

6. The method of claim 5, wherein the respective 3-dimensional rendering view comprises one or more of a lighting environment, a user's anchor position, a created anchor node, an occlusion node based on occlusion mask geometries, and a respective 3-dimensional node tree for a respective accessory.

7. The method of claim 6, wherein for each frame of the respective 3-dimensional rendering view, the method comprises using one or more of an image set as a background, an updated anchor node position based on an updated user's anchor position, an updated anchor node orientation based on a received user orientation, updated product positions and updated occlusion mask nodes': (1) updated geometries, (2) updated positions and (3) updated orientation.

8. The method of claim 1, wherein displaying the live video stream in the first portion of the user interface with the first accessory and displaying the live video stream in the second portion of the user interface with the second accessory comprises receiving a first physics engine associated with the first accessory and receiving a second physics engine associated with the second accessory.

9. The method of claim 8, wherein generating a respective 3-dimensional rendering view for each respective portion of the user interface is based on either the first physics engine or the second physics engine.

10. The method of claim 1, wherein node trees are active for the first portion and the second portion and other node trees are destroyed for portions of the live compare session that are not currently being displayed.

11. The method of claim 1, wherein machine learning techniques are applied to one of scrolling, zooming in, zooming out, deleting of a respective portion of the live compare session.

12. The method of claim 1, further comprising:
    preemptively loading a rendering system instance and a product node tree for a third portion of the live compare session not yet viewable but will be viewable as part of the live compare session.

13. The method of claim 1, further comprising:
    caching a product node tree associated with a third portion of a live compare session that is not currently being displayed as part of the live compare session.

14. The method of claim 1, further comprising:
    reusing a rendering system instance associated with a displayed portion of the live compare session for a third portion that will be displayed as part of the live compare session.

15. The method of claim 1, wherein at least one of the first portion and the second portion are displayed with a lighting environment that differs from an actual lighting environment of the user.

16. A system, comprising:
    one or more processors; and
    a computer-readable storage device storing instructions that, as a result of being executed by the one or more processors, cause the one or more processors to perform operations comprising:

receiving, via a user interface, a first identification of a first accessory to be tried on by a user in an augmented reality environment, wherein the first accessory comprises a first wearable accessory, first jewelry or first apparel;

receiving, via the user interface, a second identification of a second accessory to be tried on by the user in the augmented reality environment, wherein the second accessory comprises a second wearable accessory, second jewelry or second apparel and wherein at least one additional accessory is identified by the user to yield a set of accessories having a set number of accessories;

receiving a live video stream of the user;

receiving a request via the user interface for a live compare session in the augmented reality environment; and in response to the request, displaying, in a first portion of the user interface, a first copy of the live video stream of the user having the first accessory in the augmented reality environment and simultaneously displaying, in a second portion of the user interface, a second copy of the live video stream of the user having the second accessory in the augmented reality environment resulting in the live video stream being displayed multiple times, the multiple times matching the set number of accessories, such that a respective portion of the user interface displays the live video stream with a respective accessory from the set of accessories.

17. The system of claim 16, wherein the user interface further comprises at least one of a delete object, a purchase object, an information object, and a place-in-shopping-cart object in connection with each portion of the user interface that displays the live video stream and an associated accessory.

18. The system of claim 16, wherein the computer-readable storage device further includes additional instructions that, as a result of being executed by the one or more processors, cause the one or more processors, when the set of accessories meets a threshold, to perform further operations comprising:

presenting a scrolling user interface which enables the user to scroll through different portions of the user interface which respectively each present the live video stream of the user plus a respective accessory.

19. The system of claim 16, wherein displaying the live video stream in the first portion of the user interface with the first accessory and displaying the live video stream in the second portion of the user interface with the second accessory comprises generating a respective 3-D rendering view for each respective portion of the user interface.

20. The system of claim 19, wherein the respective 3-D rendering view comprises one or more of a lighting environment, a user's anchor position, a created anchor node, an occlusion node based on occlusion mask geometries, and a respective 3-D node tree for a respective accessory.

21. The system of claim 20, wherein the computer-readable storage device further includes additional instructions that, as a result of being executed by the one or more processors, as a result of being executed by the one or more processors, for each frame of the respective 3-D rendering view, cause the one or more processors to perform further operations comprising:

using one or more of an image set as a background, an updated anchor node position based on an updated user's anchor position, an updated anchor node orientation based on a received user orientation, updated product positions and updated occlusion mask nodes': (1) updated geometries, (2) updated positions and (3) updated orientation.

22. A method, comprising:

receiving, via a user interface, a first identification of a first accessory to be tried on by a user in an augmented reality environment, wherein the first accessory comprises a first wearable accessory, first jewelry or first apparel;

receiving, via the user interface, a second identification of second accessory to be tried on by the user in the augmented reality environment, wherein the second accessory comprises a second wearable accessory, second jewelry or second apparel and wherein at least one additional accessory is identified by the user to yield a set of accessories having a set number of accessories;

receiving a live video stream of the user;

receiving a request via the user interface for a live compare session in the augmented reality environment;

based on the request, loading a first 3-dimensional rendering system instance and a first product node tree for the first accessory;

based on the request, loading a second 3-dimensional rendering system instance and a second product node tree for the second accessory; and displaying, in the live compare session and based on the first 3-dimensional rendering system instance and the first product node tree, a first copy of the live video stream of the user having the first accessory and simultaneously displaying, in the live compare session and based on the second 3-dimensional rendering system instance and the second product node tree, a second copy of the live video stream of the user having the second accessory resulting in the live video stream being displayed multiple times, the multiple times matching the set number of accessories, such that a respective portion of the user interface displays the live video stream with a respective accessory from the set of accessories.

\* \* \* \* \*